United States Patent [19]

Schrell et al.

[11] Patent Number: 5,981,741
[45] Date of Patent: Nov. 9, 1999

[54] AMINATED ACETATE FIBER

[75] Inventors: Andreas Schrell, Kriftel, Germany; Jimmy G. Welborn, Rock Hill, S.C.

[73] Assignee: DyStar Textilfarben GmbH & Co. Deutschland KG, Frankfurt am Main, Germany

[21] Appl. No.: 09/063,162

[22] Filed: Apr. 20, 1998

[51] Int. Cl.$^6$ .............................. C08B 31/16; C08B 3/06; D06M 11/00; D06M 13/00

[52] U.S. Cl. ............................ 536/108; 8/115.51; 8/129; 8/536; 8/537; 8/539; 8/540; 8/920; 8/921; 139/420 B; 536/69; 536/76; 536/107; 536/111

[58] Field of Search ................................ 536/69, 76, 107, 536/108, 111; 8/115.51, 129, 536, 537, 539, 540, 920, 921; 139/420 B

[56] References Cited

U.S. PATENT DOCUMENTS

| | | | |
|---|---|---|---|
| 4,726,809 | 2/1988 | DeBoer | 8/115.6 |
| 5,446,140 | 8/1995 | Maheras et al. | 536/123 |
| 5,507,304 | 4/1996 | Maheras et al. | 131/331 |
| 5,542,955 | 8/1996 | Schrell et al. | 8/561 |

FOREIGN PATENT DOCUMENTS

| | | |
|---|---|---|
| 202374 | 4/1983 | Czechoslovakia . |
| 703305 | 8/1995 | European Pat. Off. . |
| 705924 | 4/1996 | European Pat. Off. . |
| 37 16755 A1 | 11/1987 | Germany . |
| 295 20 890 U | 6/1996 | Germany . |
| 195 19 021 | 11/1996 | Germany . |
| 195 49 408 | 1/1997 | Germany . |
| 96/37642 | 5/1996 | WIPO . |
| 96/37643 | 11/1996 | WIPO . |

*Primary Examiner*—Howard C. Lee

[57] ABSTRACT

Disclosed are aminated acetate fiber comprising acetylcellulose and one or more water-insoluble quaternary starch ether esters, said starch ether esters containing ester groups of formulae $-O-CO-CH_3$ and/or $-O-CO-C_2H_5$ and ether groups of the general formula I $$-O-CH_2-X-CH_2-N^+R_3A^- \quad (I)$$

where

X is a direct bond or $-CH(OH)-$ and $A^-$ is an anion or one equivalent of an anion, and R is hydrogen, methyl and/or ethyl, and the degree of substitution of said ether group being within the range from 0.002 to 0.8, the degree of substitution of said ester group being within the range from 0.7 to 2.998 and the overall degree of substitution being within the range from 1.5 to 3, its preparation and its use and also quaternary starch ether esters present therein.

17 Claims, No Drawings

AMINATED ACETATE FIBER

DESCRIPTION

The present invention relates to aminated acetate fiber, its preparation and its use, and also to quaternary starch ether esters present therein.

Acetate fiber has similar dyeing characteristics to polyester fiber. It is dyed with disperse dyes which, however, unlike with polyester, do not penetrate into the interior of the fiber and are held at the fiber surface only by van der Waals forces. Accordingly, the wetfastnesses are generally unsatisfactory.

Cellulose acetate, however, is becoming increasingly important as a frequent component of fiber blends, for example with wool or natural or regenerated cellulosics. There is thus an urgent need for an acetate fiber which can be dyed, not just with disperse dyes, but also with anionic textile dyes and on which it is possible to obtain dyeings having satisfactory wetfastnesses.

It has now been found that, surprisingly, acetate fiber modified with certain water-insoluble quaternary starch ether esters have the requisite properties.

Water-soluble quaternary ammonium ether alkyl ester starches are already known from DE-A 37 16 755, where they are described as an ingredient of textile sizes. Owing to their water solubility, however, they are absolutely unsuitable for an acetate spinning process. The quaternary starch ether esters of the present invention, by contrast, are insoluble in water, but soluble in acetone and hence suitable for a spinning process for preparing acetate fiber. They are new and likewise form part of the subject-matter of the present invention.

The present invention accordingly provides aminated acetate fiber comprising acetylcellulose and one or more water-insoluble quaternary starch ether esters, said starch ether esters containing ester groups of formulae —O—CO—CH$_3$ and/or —O—CO—C$_2$H$_5$ and ether groups of the general formula I

$$\text{—O—CH}_2\text{—X—CH}_2\text{—N}^+\text{R}_3\text{A}^- \qquad \text{(I)}$$

where

X is a direct bond or —CH(OH)— and

A$^-$ is an anion or one equivalent of an anion, and

R is hydrogen, methyl and/or ethyl, and the degree of substitution of said ether group being within the range from 0.002 to 0.8, the degree of substitution of said ester group being within the range from 0.7 to 2.998 and the overall degree of substitution being within the range from 1.5 to 3.

The present invention also provides a water-insoluble quaternary starch ether ester containing ester groups of the formulae —O—CO—CH$_3$ and/or —O—CO—C$_2$H$_5$ and ether groups of the general formula I

$$\text{—O—CH}_2\text{—X—CH}_2\text{—N}^+\text{R}_3\text{A}^- \qquad \text{(I)}$$

where

X is a direct bond or —CH(OH)— and

A$^-$ is an anion or one equivalent of an anion, and

R is hydrogen, methyl and/or ethyl, the degree of substitution of said ether group being within the range from 0.002 to 0.8, the degree of substitution of said ester group being within the range from 0.7 to 2.998 and the overall degree of substitution being within the range from 1.5 to 3.

A degree of substitution of 3 means that every one of the three free OH groups in each glucose unit is substituted by an ether or ester group. A degree of substitution of 0.1 means that, on average, an OH group is etherified or esterified in every tenth glucose unit.

The aminated acetate fiber of the present invention can comprise the water-insoluble quaternary starch ether esters within wide amount ranges, which are determined especially by the properties the fiber is to possess. Preferably, however, it comprises from 0.1 to 20% by weight, particularly preferably from 1 to 12% by weight, of starch ether ester, reckoned as dry weight, based on the acetylcellulose content.

The acetylcellulose used can be a commercially available material, a degree of substitution within the range from 2.3 to 2.8 being preferred.

The water-insoluble quaternary starch ether esters of the present invention preferably have an acetyl group as ester group. Preferred ether groups of the general formula I are those in which the three R substituents are all the same. A$^-$ is preferably chloride or one equivalent of sulfate or phosphate.

The degree of substitution of the ether group is preferably within the range from 0.2 to 0.7, and the degree of substitution of the ester group is preferably within the range from 2 to 2.6. The overall degree of substitution Is preferably within the range from 2.5 to 3.

The degree of polymerization of the water-insoluble quaternary starch ether esters of the present invention is advantageously between 100 and 1000, preferably between 100 and 400, anhydroglucose units.

The water-insoluble quaternary starch ether esters of the present invention can be prepared in a conventional manner by etherifying starch with reagents which introduce ether groups of the general formula I into the starch, then esterifying the etherified starch with an acetylating or propionylating reagent and, if necessary, partially hydrolyzing the esterified etherified starch to the desired degree of substitution. The starch used can be a customary, commercially available starch, for example potato starch, corn starch or wheat starch.

Preference is given to starting from commercially available cationic starches which already contain ether groups of the general formula I with a degree of substitution within the range from 0.002 to 0.8 and esterifying these, for example with acetic anhydride, at elevated temperature under the catalytic action of aqueous sodium hydroxide. The resulting product can then be precipitated in water or ethanol, washed and dried.

The resulting water-insoluble quaternary starch ether ester of the present invention can be used directly in the preparation of the aminated acetate fiber of the present invention. To this end, it is mixed in the desired amount, preferably in an amount of 0.1 to 20% by weight, particularly preferably from 1 to 12% by weight, reckoned as dry weight, based on the acetylcellulose content, into an acetate spinning dope and the resulting dope is spun into fiber.

Owing to the good acetone solubility of the water-insoluble quaternary starch ether esters of the present invention, this mixing in results in good dispersion. The spinning of the spinning dope is carried out by methods which are customary and familiar to the person skilled in the art, for example by the dry spinning or wet spinning process.

An alternative process for preparing the aminated acetate fiber of the present invention comprises mixing a cationic starch already containing ether groups of the general formula I with a degree of substitution within the range from 0.002 to 0.8 with cellulose, acetylating or propionylating the resulting mixture, partially hydrolyzing the acetylated or propionylated mixture to the desired degree of substitution, and precipitating and spinning the resulting product.

The aminated acetate fiber of the present invention can be dyed with anionic textile dyes by various methods, such as exhaust, padding and modern printing methods, such as the ink jet method, without use of salt or alkali after processing into wovens and knits.

The present invention further provides a process for preparing a dyed or printed textile material composed of aminated acetate fiber of the present invention, which comprises dyeing or printing a woven or knit composed of aminated acetate fiber of the present invention with one or more textile dyes.

The fiber material of the present invention which is used in the dyeing process of the present invention can be present in all processing states, for example as yarn, staple, slubbing and piece goods (fabric).

As well as disperse dyes, which are customarily used for dyeing acetate fiber, the textile dyes used can include dyes which generally have an anionic structure. Particularly suitable textile dyes are fiber-reactive textile dyes which are capable of reacting with hydroxyl groups or amino and thiol groups to form a covalent bond, Preferred fiber-reactive components on textile dyes are especially sulfatoethylsulfonyl, vinylsulfonyl, chlorotriazinyl, fluorotriazinyl, fluorochloropyrimidyl, difluoropyrimidyl and dichloroquinoxalinyl and also combinations thereof.

Unless otherwise stated, the parts and percentages recited in the examples which follow are by weight. The molar masses of the starches used are customarily based on anhydroglucose units.

EXAMPLE 1 a) Preparation of an aminated starch acetate 20 g of a commercially available cationic starch (molar mass: 165, degree of substitution: 0.02, moisture content: 7%, X=—OH(OH)—, R=methyl, A$^-$=Cl$^-$) are in a kneader introduced into 80 g of acetic anhydride and admixed with 4.4 g of 50% strength by weight aqueous sodium hydroxide solution. The reaction mixture is heated to 120° C. and left at that temperature for 5 hours. After the reaction has ended, the system is allowed to cool down and the viscous mixture is admixed with 100 g of ethanol by thorough mixing. The mixture is subsequently stirred for 10 minutes. During this operation, the cationic starch acetate precipitates in the form of a white powder. The precipitated product is filtered off with suction, washed once more intensively with ethanol and dried. The degree of substitution for the cationic substitution is subsequently 0.02, and the degree of acyl substitution is 2.8. The product is readily soluble in acetone, but insoluble in water.

b) Preparation of a fiber

The starch derivative obtained as per a) is incorporated into a production cellulose acetate spinning solution having a solids content of 26% as follows: 26 parts of the modified starch are mixed with 74 parts of a 97:3 acetone/water mixture. Of this mixture, 5 parts are intimately mixed with 95 parts of a production cellulose acetate spinning solution and dry spun into fiber.

c) Preparation of a dyed fiber 10 parts of the dry acetate fiber obtained as per b) is admixed with 100 parts of water in a dyeing machine. The temperature is raised to 800° C. and 0.1 part of the electrolyte-comprising dye C.I. Direct Blue 199 is metered in over a period of 80 minutes. Following a post-addition running time of 5 minutes, the almost colorless residual liquor is dropped and the material is washed off and dried in a conventional manner. The dyeing obtained has a strong turquoise color and is absolutely equivalent to a dyeing with disperse dyes. The fastness level is equivalent to that of direct dyes on cellulosic textiles.

EXAMPLE 2 a) Preparation of an aminated starch acetate 25 g of a commercially available cationic starch (molar mass; 165, degree of substitution: 0.45, moisture content: 7%, X=—CH(OH)—, R=methyl, A$^-$=Cl$^-$) are in a kneader combined with 80 g of acetic anhydride and admixed with 4.4 g of 5.0% strength by weight aqueous sodium hydroxide solution. After the exothermic reaction has died down, the reaction mixture is left for 4.5 hours at 120° C. After the reaction has ended, the system is allowed to cool down and the viscous mixture is admixed with 100 ml of a 90:10 ethanol/water mixture by thorough mixing. The mixture is subsequently stirred for 30 minutes. The cationic starch acetate precipitates in the form of a white, tacky solid. The precipitated product is filtered off with suction, washed intensively with a 90:10 ethanol/water mixture and dried. The degree of substitution for the cationic substitution is subsequently 0.45, and the degree of acyl substitution is 2.4. The starch ester is moderately soluble in acetone, but insoluble in water.

b) Preparation of a fiber

The starch derivative obtained as per a) is incorporated into a production cellulose acetate spinning solution having a solids content of 27% as follows: 27 parts of the modified starch are mixed with 73 parts of acetone. Of this mixture, 6 parts are intimately mixed with 94 parts of a production cellulose acetate spinning solution and dry spun into fiber.

c) Preparation of a dyed fiber 10 parts of the dry acetate fiber obtained as per b) is admixed with 100 parts of water in a dyeing machine. The temperature is raised to 80° C. and 0.2 part of the electrolyte-comprising dye C.I. Blue 220 is metered in over a period of 30 minutes. Following a post-addition running time of 15 minutes, the almost colorless residual liquor is dropped and the material is washed off and dried in a conventional manner. The dyeing obtained has a strong blue color and is absolutely equivalent to a dyeing with disperse dyes. The fastness level is equivalent to that of reactive dyes on cellulosic textiles.

What is claimed is:

1. Aminated acetate fiber comprising acetylcellulose and one or more water-insoluble quaternary starch ether esters, said starch ether esters containing ester groups of formulae —O—CO—CH$_3$ and/or —O—CO—C$_2$H$_5$ and ether groups of the general formula I

where

X is a direct bond or —CH(OH)— and

A$^-$ is an anion or one equivalent of an anion, and

R is hydrogen, methyl and/or ethyl, and the degree of substitution of said ether group being within the range from 0.002 to 0.8, the degree of substitution of said ester group being within the range from 0.7 to 2.998 and the overall degree of substitution being within the range from 1.5 to 3.

2. The aminated acetate fiber of claim 1, comprising said water-insoluble quaternary starch ether ester in amounts from 0.1 to 20% by weight, reckoned as dry weight, based on the acetylcellulose content.

3. The aminated acetate fiber of claim 1 comprising acetylcellulose having a degree of substitution within the range from 2.3 to 2.8.

4. A water-insoluble quaternary starch ether ester containing ester groups of the formulae —O—CO—CH$_3$ and/or —O—CO—C$_2$H$_5$ and other groups of the general formula I $$—O—CH_2—X—CH_2—N^+R_3A^- \qquad (I)$$

where

X is a direct bond or —CH(OH)— and

A$^-$ is an anion or one equivalent of an anion, and

R is hydrogen, methyl and/or ethyl, and the degree of substitution of said ether group being within the range from 0.002 to 0.8, the degree of substitution of said ester group being within the range from 0.7 to 2.998 and the overall degree of substitution being within the range from 1.5 to 3.

5. The water-insoluble quaternary starch ether ester of claim 4, wherein the ester group is an acetyl group, the three R substituents in the general formula I are all the same and A$^-$ is chloride or one equivalent of sulfate or phosphate.

6. The water-insoluble quaternary starch ether ester of claim 4, wherein the degree of substitution of said ether group is within the range from 0.2 to 0.7, the degree of substitution of said ester group is within the range from 2 to 2.5 and the overall degree of substitution is within the range from 2.5 to 3.

7. A process for preparing a water-insoluble quaternary starch ether ester as claimed in claim 4, which comprises etherifying starch with reagents which introduce ether groups of the general formula of claim 4 I into said starch, then esterifying the etherified starch with an acetylating or propionylating reagent and, optionally, partially hydrolyzing the esterified etherified starch to a said degree of substitution.

8. A process for preparing an aminated acetate fiber as claimed in claim 1, which comprises mixing a cationic starch containing ether groups of the general formula of claim 1 I with a degree of substitution within the range from 0.002 to 0.8 with cellulose, acetylating or propionylating the resulting mixture, partially hydrolyzing the acetylated or propionylated mixture to a said degree of substitution, and precipitating and spinning the resulting product.

9. A process for preparing a dyed or printed textile material comprised of aminated acetate fiber as claimed in claim 1, which comprises dyeing or printing a woven or knit comprised of aminated acetate fiber as claimed in claim 1 with one or more textile dyes.

10. A process for preparing an aminated acetate fiber as claimed in claim 1, which comprises mixing acetylcellulose and a said water-insoluble quaternary starch ether ester into an acetate spinning dope and spinning the resulting spinning dope into fiber.

11. The process of claim 9, wherein a said textile dye is a disperse dye or an anionic textile dye.

12. A woven or knit material prepared according to claim 9.

13. The aminated acetate fiber of claim 2, wherein the amount of said water-insoluble quaternary starch ether ester ranges from 1 to 12% by weight, reckoned as dry weight, based on the acetylcellulose content.

14. The aminated acetate fiber of claim 1, wherein the three R substituents of said general formula I are the same.

15. The aminated acetate fiber of claim 14, wherein said three R substituents are methyl groups.

16. A solution comprising a water-insoluble quaternary starch ether ester of claim 4 and a solvent comprising acetone.

17. A dyed fiber material comprised of an aminated acetate fiber as claimed in claim 1 which has been dyed with a disperse dye or an anionic dye.

* * * * *